(12) United States Patent
Shi et al.

(10) Patent No.: US 7,706,566 B2
(45) Date of Patent: Apr. 27, 2010

(54) SYSTEM AND METHOD FOR REVERSIBLE DATA HIDING BASED ON INTEGER WAVELET SPREAD SPECTRUM

(75) Inventors: Yun-Qing Shi, Millburn, NJ (US); Guorong Xuan, Shanghai (CN)

(73) Assignee: New Jersey Institute of Technology, Newark, NJ (US)

( * ) Notice: Subject to any disclaimer, the term of this patent is extended or adjusted under 35 U.S.C. 154(b) by 1321 days.

(21) Appl. No.: 11/068,063

(22) Filed: Feb. 28, 2005

(65) Prior Publication Data
US 2005/0244032 A1 Nov. 3, 2005

Related U.S. Application Data

(60) Provisional application No. 60/556,924, filed on Mar. 26, 2004.

(51) Int. Cl.
*G06K 9/00* (2006.01)

(52) U.S. Cl. .................. 382/100; 358/3.28; 375/240.19; 382/250; 382/280

(58) Field of Classification Search ................ 358/3.28; 375/240.18, 240.19; 382/100, 240, 278, 382/250, 251, 280, 281
See application file for complete search history.

(56) References Cited

U.S. PATENT DOCUMENTS

| | | | |
|---|---|---|---|
| 5,646,997 A | 7/1997 | Barton | |
| 6,278,791 B1 | 8/2001 | Honsinger et al. | |
| 6,385,329 B1 | 5/2002 | Sharma et al. | |
| 6,415,042 B1 * | 7/2002 | Shin | 382/100 |
| 6,476,805 B1 * | 11/2002 | Shum et al. | 345/420 |
| 6,535,616 B1 | 3/2003 | Hayashi et al. | |
| 6,600,838 B2 * | 7/2003 | Chui | 382/249 |
| 6,654,479 B1 * | 11/2003 | Liao et al. | 382/100 |
| 6,891,973 B1 * | 5/2005 | Atsumi et al. | 382/232 |

(Continued)

FOREIGN PATENT DOCUMENTS

EP 1220152 A2 7/2002

(Continued)

OTHER PUBLICATIONS

Fridrich et al.; Invertible Authenication; Proc. SPIE Photonics West, Security and Watermarking of Multimedia Contents III; Jan. 2001; vol. 397; pp. 1-12.

(Continued)

*Primary Examiner*—Gregory M Desire
(74) *Attorney, Agent, or Firm*—Connolly Bove Lodge & Hutz LLP

(57) ABSTRACT

A system and method are disclosed which may include subjecting an original, pixel domain image to an Integer Wavelet Transform (IWT) to obtain a matrix of IWT coefficients; selecting a plurality of the IWT coefficients for incorporation of information therein; and setting signs for the plurality of selected IWT coefficients according to bit values of a plurality of respective data bits. The system and method can also include subjecting a marked pixel domain image to an Integer Wavelet Transform to obtain a matrix of wavelet coefficients; selecting a plurality of the coefficients from the matrix that contain embedded information; and for each selected coefficient, extracting the data bit embedded in the coefficient, a bit value of the extracted data bit determined based on a sign of the coefficient.

89 Claims, 8 Drawing Sheets

U.S. PATENT DOCUMENTS

| | | | |
|---|---|---|---|
| 6,915,001 | B2 | 7/2005 | Tachibana et al. |
| 6,990,247 | B2 * | 1/2006 | Schwartz .................... 382/240 |
| 7,003,168 | B1 * | 2/2006 | Chao et al. .................. 382/240 |
| 7,003,666 | B1 * | 2/2006 | Inoue et al. ................. 713/176 |
| 7,127,079 | B2 * | 10/2006 | Keating et al. .............. 382/100 |
| 7,221,804 | B2 * | 5/2007 | Atsumi et al. ............... 382/239 |
| 7,292,708 | B2 * | 11/2007 | Lee et al. .................... 382/100 |
| 7,343,025 | B2 * | 3/2008 | Seo et al. .................... 382/100 |
| 7,352,914 | B2 | 4/2008 | Tapson et al. |
| 7,356,158 | B2 * | 4/2008 | Shi et al. .................... 382/100 |
| 2002/0031275 | A1 * | 3/2002 | Cho et al. ................... 382/240 |
| 2003/0012444 | A1 * | 1/2003 | Inoue et al. ................. 382/232 |
| 2003/0088373 | A1 | 5/2003 | Fields et al. |
| 2003/0099373 | A1 | 5/2003 | Joo et al. |
| 2003/0149879 | A1 * | 8/2003 | Tian et al. ................... 713/176 |
| 2005/0129271 | A1 * | 6/2005 | Shi et al. .................... 382/100 |
| 2005/0141775 | A1 * | 6/2005 | Atsumi et al. ............... 382/243 |
| 2005/0244032 | A1 * | 11/2005 | Shi et al. .................... 382/100 |
| 2006/0029282 | A1 * | 2/2006 | Meeker ...................... 382/250 |
| 2006/0039472 | A1 * | 2/2006 | Barbarien et al. ...... 375/240.16 |
| 2006/0120558 | A1 * | 6/2006 | Shi et al. .................... 382/100 |
| 2006/0126890 | A1 * | 6/2006 | Shi et al. .................... 382/100 |

FOREIGN PATENT DOCUMENTS

| | | |
|---|---|---|
| JP | 2002-44408 A | 2/2002 |
| JP | 2002-247333 A | 8/2002 |
| JP | 2003-115991 A | 4/2003 |
| JP | 2003-235016 | 8/2003 |

OTHER PUBLICATIONS

Goljan et al.; Distortion-Free Data Embedding For Images; Proceedings of 4th Information Hiding Workshop; Apr. 2001; pp. 1-15.

Domingo-Ferrer et al.; Invertible Spread-Spectrum Watermarking For Image Authentication And Multi-Level Access To Precision-Critical Watermarked Images.

Proceedings of the International Conference of Information Technology: Coding and Computing; Apr. 2002; pp. 1-6.

Celik et al.; Reversible Data Hiding; Proceedings of the International Conference on Image Processing; Sep. 2002; vol. 2; pp. 157-160.

Xuan et al.; Distortionless Data Hiding Based On Integer Wavelet Transform; IEE Electronics Letters; Dec. 2002; vol. 38, No. 25; pp. 1646-1648.

DeVleeschouwer et al.; Circular Interpretation of Bijective Transformations in Lossless Watermarking for Media Asset Mgmt.; IEEE Tran. Multimedia; Mar. 2003; vol. 5; pp. 97-105.

Ni et al.; Reversible Data Hiding; Proceedings of IEEE International Symposium on Circuit and Systems; May, 2003; vol. 2; pp. 912-915.

J. Tian; Reversible Data Embedding Using a Difference Expansion; IEEE Transactions on Circuits and Systems for Video Technology; Aug. 2003; pp. 890-896.

B. Yang et al.; Integer DCT-Based Reversible Watermarking For Images Using Companding Technique; Proceedings of SPIE; Jan. 2004; vol. 5306; pp. 1-11.

Xuan et al; High Capacity Lossless Data Hiding Based On Integer Wavelet Transform; Proceedings of IEEE 2004 Int'l Symposium on Circuits and Sys.; May 2004; vol. II; pp. 1-4.

Bernard Sklar; Digital Communications: Fundamentals and Applications; 1988; pp. 536-594.

Calderbank et al.; Wavelet Transforms That Map Integers To Integers; Applied and Computational Harmonic Analysis; Jul. 1998; pp. 1-4.

Rabbani et al.; An Overview Of The JPEG 200 Still Image Compression Standard; Signal Processing: Image Communication 17, 2002; pp. 3-48.

Int'l Search Report and Written Opinion, Aug. 31, 2005.

Ingemar J. Cox et al.: "Secure Spread Spectdrum Watermarking for Multimedia"; IEEE Transactions on Image Processing, IEEE Service Center, Piscataway, NJ, US, vol. 6, No. 12, Dec. 1, 1997 (pp. 1677-1679).

Guorong Xuan et al.: "Lossless Data Hiding Based on Integer Wavelet Transform"; Proceedings of the 2003 IEEE Radar Conference, Huntsville, AL, May 5-8, 2003, Dec. 9, 2002.

Hartung F. et al.: "Fast Public-Key Watermarking of Compressed Video"; Image Processing, 1997, Proceedings, International Conference on Santa Barbara, CA, USA Oct. 26-29, 1997, Los Alamitos, CA, USA, IEEE Comput. Soc., US, vol. 1, Oct. 26, 1997 (pp. 528-530).

Supplementary European Search Report issued in corresponding EP Application 05724198.6 on Oct. 7, 2009.

International Preliminary Report on Patentability, International Search Report and Written Opinion issued in corresponding International Application No. PCT/U52005/006604.

First Office Action issued on related Chinese application No. 200580016775.7 on May 23, 2008 (with English language text).

Distortionless Data hiding based on integer wavelet transform, Guorong Xuan, Jiang Zhu, Jidong Chen, YunQ. Shi, Zhicheng Ni, Wei Su, Electronics Letters, vol. 38, No. 25, pp. 1646-1648, Dec. 15, 2002.

A Scalable Image Compression Scheme Based on Integer-to-integer Wavelet Transform and Subband Bit-plane Coding, Yang Zhi-gao, Li Fei-peng, Mei Tian-can, Qin Qian-qing, Zhu Qui-ping, Journal of Image and Graphics, vol. 8, No. 6, pp. 625-630, Jun. 2003.

Japanese Office Action issued in related application No. 2007-504976 on May 27, 2008.

* cited by examiner

FIG. 1

| Forward transform | |
|---|---|
| Splitting: | $s_i \leftarrow x_{2i} \square d_i \leftarrow x_{2i+1}$ |
| Dual lifting: | $d_i \leftarrow d_i - \{(s_i+s_{i+1})/2\}$ |
| Primary lifting: | $s_i \leftarrow s_i + \{(d_{i-1}+d_i)/4\}$ |

| Inverse transform | |
|---|---|
| Inverse primal lifting: | $s_i \leftarrow s_i - \{(d_{i-1}+d_i)/4\}$ |
| Inverse dual lifting: | $d_i \leftarrow d_i + \{(s_i+s_{i+1})/2\}$ |
| Merging: | $x_{2i} \leftarrow s_i \square x_{2i+1} \leftarrow d_i$ |

FIG. 2

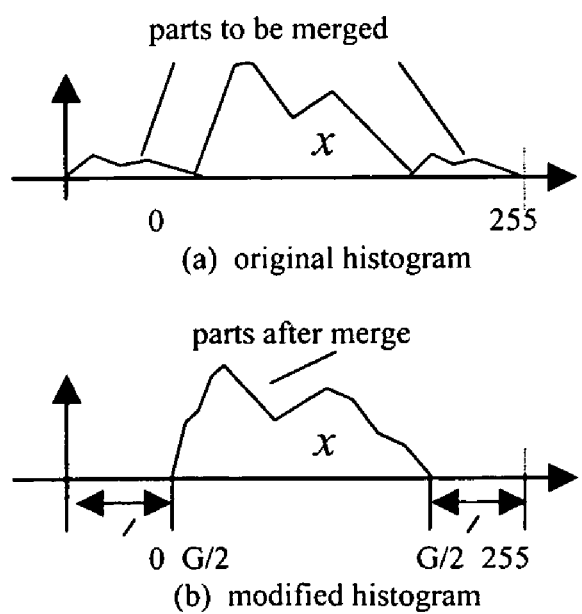

(a) original histogram (b) modified histogram

FIG. 3A
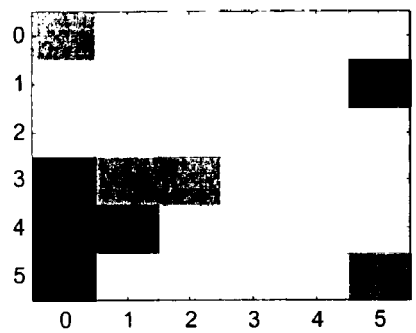
FIG. 3B
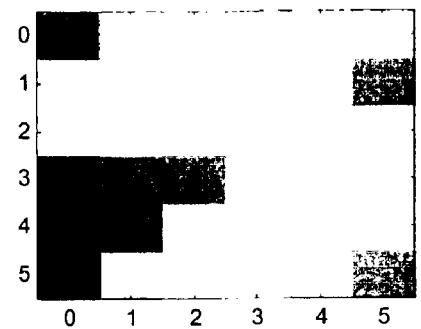
FIG. 4A
| 2 | 4 | 7 | 4 | 7 | 3 |
|---|---|---|---|---|---|
| 3 | 4 | 5 | 3 | 4 | 1 |
| 3 | 4 | 7 | 5 | 6 | 4 |
| 0 | 2 | 2 | 4 | 5 | 4 |
| 0 | 1 | 3 | 4 | 7 | 5 |
| 0 | 3 | 4 | 5 | 3 | 2 |
FIG. 4B
| 2 | 4 | 6 | 4 | 6 | 3 |
|---|---|---|---|---|---|
| 3 | 4 | 5 | 3 | 4 | 2 |
| 3 | 4 | 6 | 5 | 5 | 4 |
| 1 | 2 | 2 | 4 | 5 | 4 |
| 1 | 2 | 3 | 4 | 6 | 5 |
| 1 | 3 | 4 | 5 | 3 | 2 |
FIG. 5
| Grayscale value | 0 | 1 | 2 | 3 | 4 | 5 | 6 | 7 |
|---|---|---|---|---|---|---|---|---|
| No. before modification | 3 | 2 | 4 | 7 | 10 | 5 | 1 | 4 |
| No. in modification | 3 | 0 | 6 | 7 | 10 | 6 | 0 | 4 |
| No. after modification | 0 | 3 | 6 | 7 | 10 | 6 | 4 | 0 |

FIG. 6

For image (6×6×3), the histogram is narrowed down 1 gray scale for both sides. G=2, G/2=1. The total bits length is 37 bits.

S=the total book-keeping bit length 37 bits (00100101) + compressed number of gray scale 2 (010) +
    the first histogram from left hand side gray scale "1" (001) +record length 6 (0110) + scan sequence (101101)+
    the first histogram from right hand side gray scale "6" (110) + record length 6 (0110) + scan sequence (110111)
S=[00100101 010 001 0110 101101 110 0110 110111]

FIG. 7

Histogram modification algorithm k=0
while (k < G/2) do
1) Narrow down a grayscale level from the left-hand side:
  a. Find a grayscale $L_k$ in [k, 126] which has the minimum number of occurrence;
  b. Increase by one the grayscale level of the pixels whose grayscale level is equal or less than $L_k$.
2) Narrow down a grayscale level from the right-hand side:
  a. Find a grayscale $R_k$ in [129, 255-k] which has the minimum number of occurrence;
  b. Decrease by one the grayscale level of the pixels whose grayscale level is equal or larger than $R_k$.
3) k=k+1
end while

FIG. 10
|  | $|W|<2$ | $|W|<4$ | $|W|<6$ | $|W|<8$ | $|W|\geq 8$ |
|---|---|---|---|---|---|
| Lena | 34.7% | 66.7% | 82.7% | 90.7% | 9.3% |
| Barbara | 33.3% | 61.3% | 73.3% | 78.7% | 21.3% |
| Baboon | 13.3% | 29.3% | 42.7% | 53.3% | 46.7% |
| Medical | 52% | 80% | 88% | 92% | 8% |
FIG. 11   FIG. 12   FIG. 13   FIG. 14
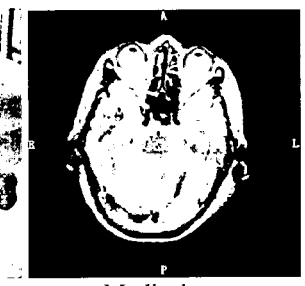
Lena  Baboon  Barbara  Medical

FIG. 15

| Payload (bpp) | 0.1 | 0.2 | 0.3 | 0.4 | 0.5 | 0.6 |
|---|---|---|---|---|---|---|
| PSNR (dB) | 48.61 | 44.99 | 41.72 | 39.16 | 36.71 | 34.54 |

FIG. 16

| Payload (bpp) | 0.1 | 0.2 | 0.3 | 0.4 | 0.5 | 0.6 |
|---|---|---|---|---|---|---|
| PSNR (dB) | 42.04 | 38.31 | 34.52 | 31.07 | 27.01 | 23.17 |

FIG. 17

| Payload (bpp) | 0.1 | 0.2 | 0.3 | 0.4 | 0.5 | 0.6 |
|---|---|---|---|---|---|---|
| PSNR (dB) | 48.67 | 45.18 | 41.78 | 39.03 | 36.10 | 30.87 |

FIG. 18

| Payload (bpp) | 0.1 | 0.2 | 0.3 | 0.4 | 0.5 | 0.6 |
|---|---|---|---|---|---|---|
| PSNR (dB) | 52.06 | 48.42 | 44.80 | 41.64 | 40.48 | 36.30 |

CAPACITY VS. DISTORTION COMPARISON ON LENA

—*—*— SS TECHNIQUE PROPOSED IN THIS PAPER
—□—□— DIFFERENCE EXPANSION TECHNIQUE [10]
—○—○— DCT COMPANDING TECHNIQUE [11]
—×—×— GLSB TECHNIQUE [6]

CAPACITY VS. DISTORTION COMPARISON ON BARBARA

—*—*— SS TECHNIQUE PROPOSED IN THIS PAPER
—□—□— DIFFERENCE EXPANSION TECHNIQUE [10]
—○—○— DCT COMPANDING TECHNIQUE [11]
—×—×— GLSB TECHNIQUE [6]

SYSTEM AND METHOD FOR REVERSIBLE DATA HIDING BASED ON INTEGER WAVELET SPREAD SPECTRUM

CROSS-REFERENCE TO RELATED APPLICATIONS

This application claims the benefit of U.S. Provisional Patent Application Ser. No. 60/556,924, entitled "METHOD AND APPARATUS FOR LOSSLESS DATA HIDING BASED ON INTEGER WAVELET TRANSFORM USING SPREAD SPECTRUM TECHNIQUE," by inventors Yun-Qing Shi and Guorong Xuan, filed Mar. 26, 2004, the entire disclosure of which is hereby incorporated herein by reference.

BACKGROUND OF THE INVENTION

Data hiding has become an intensive research area in recent years. Most multimedia data hiding techniques modify and therefore distort the cover media during the data hiding process. Even though the distortion is often small and imperceptible to human visual systems (HVS), the original cover media usually cannot be restored completely. In other words, most of these data hiding techniques are nonreversible, which is not acceptable for some sensitive applications, such as legal and medical imaging.

For legal, medical, and other sensitive applications, reversible data hiding is desired in order to extract the embedded data as well as to recover the original host signal. Reversible (also often referred to as invertible, lossless, or distortion-free) data hiding has been a very active research subject in the last few years. Many reversible data hiding schemes have been reported, such as in documents numbered 1-11 below.

In documents [2] and [8], identified below, modulo-256 addition is utilized to avoid overflow and underflow and thus achieves reversibility. The scheme proposed by Fridrich et al. [3] losslessly compresses the bit-planes in the spatial domain and hence saves space to embed the payload (to-be-embedded data) and overhead (bookkeeping data) to achieve reversible data hiding. The payload of this technique is quite small owing to the rather limited compression ratio that can be achieved in the spatial domain. Based on this, a general least significant bit-plane (GLSB) embedding technique in the spatial domain was proposed by Celik et al. [6]. The payload and imperceptibility of embedded data are largely improved because of the more efficient compression technique used therein. Domingo-Ferrer et al. [5] proposed a spatial-domain spread-spectrum data hiding method. However, it is only reversible with respect to the modified version of the original host signal. Xuan et al. [7] proposed a reversible data hiding algorithm carried out in the integer wavelet transform (IWT) domain.

Tian [10] embeds the data using a difference expansion technique, resulting in an improved reversible data hiding method in terms of data embedding capacity versus visual quality of marked images. Yang et al. [11] proposed a reversible data hiding technique using the companding technique. This technique embeds data in discrete cosine transform (DCT) coefficients.

SUMMARY OF THE INVENTION

According to one aspect, the present invention provides a reversible data hiding method based on the integer wavelet spread spectrum and histogram modification. In one embodiment, data is embedded in the coefficients of high frequency sub-bands of an integer wavelet transform. Pseudo bits may also be embedded so that coefficients not suitable for embedding of signal bits can be flagged for the decoder without a need for a map illustrating which coefficients have embedded signal bits and which have embedded pseudo bits. This preferably enhances data hiding efficiency.

To prevent overflow and underflow, an efficient histogram modification method can be employed. Experimental results on some frequently used images show that the method disclosed herein has achieved superior performance in terms of data-embedding capacity and visual quality of marked images, compared with existing reversible data hiding schemes.

According to one aspect, the invention provides a method, comprising: subjecting an original, pixel domain image to an Integer Wavelet Transform (IWT) to obtain a matrix of IWT coefficients; selecting a plurality of the IWT coefficients for incorporation of information therein; and setting signs for the plurality of selected IWT coefficients according to bit values of a plurality of respective data bits, thereby incorporating the respective data bits into the plurality of IWT coefficients. Preferably, the selecting comprises: selecting the IWT coefficients within at least one frequency sub-band of the matrix of IWT coefficients. Preferably, the at least one frequency sub-band comprises at least one frequency sub-band selected from the group consisting of: an HL sub-band, an LH sub-band, and an HH sub-band. Preferably, the setting comprises: establishing one of positive sign and a negative sign for each of the plurality of selected IWT coefficients based on the bit values of the plurality of respective data bits. Preferably, the setting comprises at least one of: making the sign for each coefficient positive if the bit value of the coefficient's respective data bit is one of 1 and 0; and making the sign for each coefficient negative if the bit value of the coefficient's respective data bit is the other of 1 and 0.

Preferably, the method further comprises: narrowing a histogram of the original image prior to the setting. Preferably, the method further comprises: recording the narrowing of the histogram with bookkeeping data; and embedding the bookkeeping data in the image.

According to another aspect, the invention provides an apparatus including a processor operating under the instructions of a software program, the software program causing the apparatus to perform actions, comprising: subjecting an original, pixel domain image to an Integer Wavelet Transform (IWT) to obtain a matrix of IWT coefficients; selecting a plurality of the IWT coefficients for incorporation of information therein; and setting signs for the plurality of selected IWT coefficients according to bit values of a plurality of respective data bits, thereby incorporating the respective data bits into the plurality into the plurality of IWT coefficients.

According to yet another aspect, the invention provides a storage medium containing a software program operable to cause an apparatus including a processor under the instructions of the software program to perform actions, comprising: subjecting an original, pixel domain image to an Integer Wavelet Transform (IWT) to obtain a matrix of IWT coefficients; selecting a plurality of the IWT coefficients for incorporation of information therein; and setting signs for the plurality of selected IWT coefficients according to bit values of a plurality of respective data bits, thereby incorporating the respective data bits into the plurality into the plurality of IWT coefficients.

According to yet another aspect, the invention provides a method, comprising: subjecting an original, pixel domain image to an Integer Wavelet Transform (IWT) to obtain a matrix of original IWT coefficients; selecting a plurality of the original IWT coefficients for embedding of data therein; establishing a shift value for the plurality of original coefficients; establishing a plurality of sign factors corresponding to respective ones of the plurality of original coefficients; and for each original coefficient, establishing a marked coefficient, the marked coefficient corresponding to the original coefficient and to the sign factor corresponding to the original coefficient, the marked coefficient being set equal to a value of the original coefficient added to a product of a) the sign factor corresponding to the original coefficient and b) the shift value.

Preferably, establishing the shift value comprises: selecting a magnitude of the shift value as a function of a) a level of distortion of the image arising from the marking using the shift value and b) a quantity of data to be embedded into the image via the marking. Preferably, establishing the shift value comprises: selecting the shift value based on a distribution of magnitudes among the plurality of original coefficients. Preferably, establishing the sign factor corresponding to each original coefficient comprises establishing a sign of the sign factor. Preferably, establishing the sign factor corresponding to each original coefficient comprises: for each original coefficient having a magnitude greater than or equal to the shift value, thereby providing a large coefficient, setting a sign of the sign factor for the large coefficient equal to the sign of the large coefficient. Preferably, establishing the sign factor comprises: setting each sign factor equal to either +1 or −1 based on a bit value to be embedded in the original coefficient corresponding to each sign factor. Preferably, establishing the sign factor comprises at least one of: setting each sign factor equal to +1 if a bit value slated for embedding in the original coefficient corresponding to the sign factor is one of 1 and 0; and setting each sign factor equal to −1 if a bit value slated for embedding in the original coefficient corresponding to the sign factor is the other of 1 and 0. Preferably, establishing the marked coefficient for each original coefficient comprises: embedding a watermark signal into the image. Preferably, establishing the marked coefficient comprises one of: embedding a signal bit forming part of a watermark signal into the marked coefficient if a magnitude of the original coefficient corresponding to the marked coefficient is less than a magnitude of the shift value; and embedding a pseudo bit into the marked coefficient if the magnitude of the original coefficient corresponding to the marked coefficient is greater than or equal to the magnitude of the shift value.

Preferably, the method further comprises: narrowing an initial histogram of the image prior to establishing the marked coefficient. Preferably, the narrowing comprises: relocating toward a center of the initial histogram pixel counts for grayscale values lower than a specified threshold; and relocating toward a center of the initial histogram pixel counts for grayscale values higher than a grayscale value equal to a maximum grayscale value for the initial histogram minus the specified threshold. Preferably, the method further comprises: recording data describing the narrowing of the histogram as bookkeeping data. Preferably, the method further comprises: embedding the bookkeeping information in the image.

According to yet another aspect, the invention provides an apparatus including a processor operating under the instructions of a software program, the software program causing the apparatus to perform actions, comprising: subjecting an original, pixel domain image to an Integer Wavelet Transform (IWT) to obtain a matrix of original IWT coefficients; selecting a plurality of the original IWT coefficients for embedding of data therein; establishing a shift value for the plurality of original coefficients; establishing a plurality of sign factors corresponding to respective ones of the plurality of original coefficients; and for each original coefficient, establishing a marked coefficient, the marked coefficient corresponding to the original coefficient and to the sign factor corresponding to the original coefficient, the marked coefficient being set equal to a value of the original coefficient added to a product of a) the sign factor corresponding to the original coefficient and b) the shift value.

According to yet another aspect, the invention provides a storage medium containing a software program operable to cause an apparatus including a processor operating under the instructions of the software program to perform actions, including: subjecting an original, pixel domain image to an Integer Wavelet Transform (IWT) to obtain a matrix of original IWT coefficients; selecting a plurality of the original IWT coefficients for embedding of data therein; establishing a shift value for the plurality of original coefficients; establishing a plurality of sign factors corresponding to respective ones of the plurality of original coefficients; and for each original coefficient, establishing a marked coefficient, the marked coefficient corresponding to the original coefficient and to the sign factor corresponding to the original coefficient, the marked coefficient being set equal to a value of the original coefficient added to a product of a) the sign factor corresponding to the original coefficient and b) the shift value.

According to yet another aspect, the invention provides a method, comprising: subjecting a marked pixel domain image to an Integer Wavelet Transform (IWT) to obtain a matrix of wavelet coefficients; selecting a plurality of the coefficients from the matrix that contain embedded information; and for each selected coefficient, extracting a data bit embedded in the coefficient, a bit value of the extracted data bit determined based on a sign of the coefficient. Preferably, the selected plurality of coefficients comprises coefficients within at least one frequency sub-band of the matrix of IWT coefficients. Preferably, the selected plurality of coefficients comprises coefficients located within at least one frequency sub-band selected from the group consisting of: an HL sub-band, an LH sub-band, and an HH sub-band. Preferably, the selected plurality of coefficients comprises: coefficients indicated by the output of a random number generator, the random number generator employing a seed used by an encoder to identify the selected plurality of coefficients for embedding data.

Preferably, the extracting comprises at least one of: for each selected coefficient, extracting a bit value of "1" if the sign of the coefficient is one of positive and negative; and extracting a bit value of "0" if the sign of the coefficient is the other of positive and negative. Preferably, the extracting comprises: for each selected coefficient, extracting either a signal bit or a pseudo bit from the coefficient depending on a magnitude of the coefficient. Preferably, the extracting comprises: for each selected coefficient, extracting a signal bit forming part of a watermark signal embedded into the marked image if a pre-embedding magnitude of the coefficient is less than a magnitude of a shift value used for marking the image. Preferably, the extracting comprises: for each selected coefficient, extracting a pseudo bit to be excluded from a watermark signal to be extracted from the marked image if a pre-embedding magnitude of the coefficient is greater than or equal to a magnitude of a shift value used for marking the image.

Preferably, the method further comprises: for each selected coefficient, restoring a coefficient value existing prior to an embedding of data in the coefficient, thereby restoring a condition of the image prior to the embedding. Preferably, an initial histogram of the image was narrowed prior to the embedding and bookkeeping data was preserved describing the narrowing, the method further comprising: restoring the initial histogram of the image using the preserved bookkeeping data. Preferably, the method further comprises extracting the bookkeeping data from the matrix of wavelet coefficients.

According to yet another aspect, the invention provides an apparatus including a processor operating under the instructions of a software program, the software program causing the apparatus to perform actions, comprising: subjecting a marked pixel domain image to an Integer Wavelet Transform (IWT) to obtain a matrix of wavelet coefficients; selecting a plurality of the coefficients from the matrix that contain embedded information; and for each selected coefficient, extracting a data bit embedded in the coefficient, a bit value of the extracted data bit determined based on a sign of the coefficient.

According to yet another aspect, the invention provides a storage medium containing a software program operable to cause an apparatus including a processor operating under the instructions of the software program to perform actions, comprising: subjecting a marked pixel domain image to an Integer Wavelet Transform (IWT) to obtain a matrix of wavelet coefficients; selecting a plurality of the coefficients from the matrix that contain embedded information; and for each selected coefficient, extracting a data bit embedded in the coefficient, a bit value of the extracted data bit determined based on a sign of the coefficient.

Other aspects, features, advantages, etc. will become apparent to one skilled in the art when the description of the preferred embodiments of the invention herein is taken in conjunction with the accompanying drawings.

BRIEF DESCRIPTION OF THE DRAWING

For the purposes of illustrating the various aspects of the invention, there are shown in the drawings forms that are presently preferred, it being understood, however, that the invention is not limited to the precise arrangements and instrumentalities shown.

FIG. 1 shows formulae used for both the forward and reverse Integer Wavelet Transforms for image data manipulation in accordance with one or more embodiments of the present invention;

FIG. 2 illustrates histograms of a) an original image suitable for modification in accordance with one or more embodiments of the present invention and b) a histogram of the image shown in (a) which has been modified in accordance with one or more embodiments of the present invention;

FIG. 3A illustrates a simplified original image suitable for histogram modification in accordance with one or more embodiments of the present invention;

FIG. 3B illustrates a version of the image shown in FIG. 3A that has been modified in accordance with one or more embodiments of the present invention;

FIG. 4A shows image data representing the original image shown in FIG. 3A;

FIG. 4B shows image data representing the modified image shown in FIG. 3B;

FIG. 5 is a table of histogram data of the image of FIG. 3 before and after modification in accordance with one or more embodiments of the present invention;

FIG. 6 is a table of bookkeeping information associated with the modification of the histogram of the image of FIG. 3 suitable for preservation by a method in accordance with one or more embodiments of the present invention;

FIG. 7 is a listing of a histogram modification algorithm in accordance with one or more embodiments of the present invention;

FIG. 10 is data table listing a statistical distribution of the magnitudes of high frequency CDF(2,2) IWT coefficients for images suitable for marking using a method in accordance with one or more embodiments of the present invention;

FIGS. 11-14 illustrate commonly used images (FIG. 11: "Lena"; FIG. 12: "baboon"; FIG. 13: "Barbara"; FIG. 14: "Medical") suitable for marking using a method in accordance with one or more embodiments of the present invention;

FIG. 15 is a data table listing the Payload vs. PSNR (Peak Signal to Noise Ratio) of the "Lena" image of FIG. 11 that has been marked in accordance with one or more embodiments of the present invention;

FIG. 16 is a data table listing the Payload vs. PSNR (Peak Signal to Noise Ratio) of the "Baboon" image of FIG. 12 that has been marked in accordance with one or more embodiments of the present invention;

FIG. 17 is a data table listing the Payload vs. PSNR (Peak Signal to Noise Ratio) of the "Barbara" image of FIG. 13 that has been marked in accordance with one or more embodiments of the present invention;

FIG. 18 is a data table listing the Payload vs. PSNR (Peak Signal to Noise Ratio) of the "Medical" image of FIG. 14 that has been marked in accordance with one or more embodiments of the present invention;

DETAILED DESCRIPTION OF THE PREFERRED EMBODIMENTS

Figure 8A:
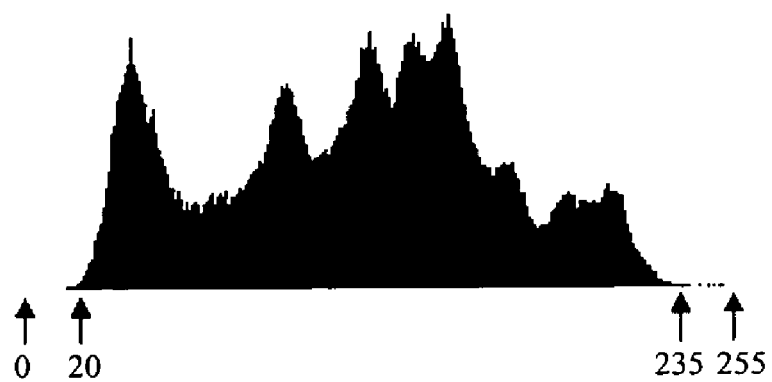
FIG. 8A is a histogram of the original "Lena" image, the histogram suitable for modification in accordance with one or more embodiments of the present invention.
Figure 8B:
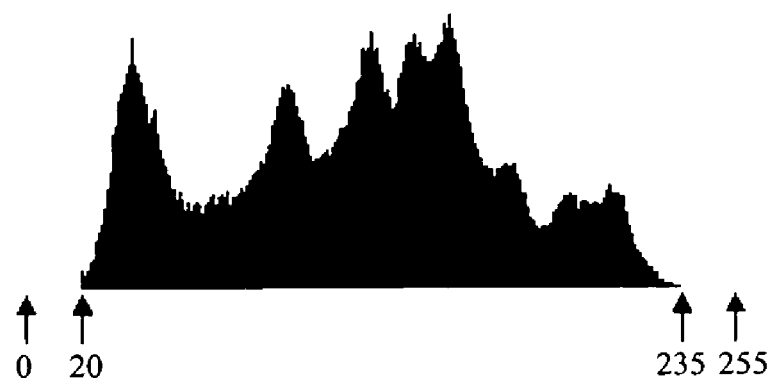
FIG. 8B is a version of the histogram shown in FIG. 8A that has been modified in accordance with one or more embodiments of the present invention.

It is noted that the methods and apparatus described thus far and/or described later in this document may be achieved utilizing any of the known technologies, such as standard digital circuitry, analog circuitry, any of the known processors that are operable to execute software and/or firmware programs, programmable digital devices or systems, programmable array logic devices, or any combination of the above. One or more embodiments of the invention may also be embodied in a software program for storage in a suitable storage medium and execution by a processing unit.

Herein, the term "watermark signal" is information, which may form part of a coherent message, which an encoder may embed in an image and which a decoder can then extract from the image. Thus, there may be both an unencoded form of the watermark signal which exists prior to it being embedded into an image. Once embedded into an image, the watermark signal is preferably recoverable by a decoder employing a method in accordance with one or more embodiments of the present invention. Herein, the terms "frequency band" and frequency sub-band" correspond to the term "wavelet sub-band."

Information other than watermark signal data bits may also be embedded into an image. One of these other categories of information includes "pseudo bits." When a coefficient is deemed suitable for the embedding of watermark signal data, a "real bit," also referred to herein as a "signal bit," may be embedded therein by the encoder. When a coefficient is deemed unsuitable for embedding of watermark signal data, a pseudo bit may be embedded therein. Herein, a pseudo bit is a bit which, although embedded in a coefficient, is not a part of the watermark signal embedded into an image.

Upon decoding, by evaluating the magnitude of a coefficient in comparison to the magnitude of a shift value, the decoder can determine whether a bit embedded in a coefficient, and then extracted therefrom by the decoder, is a signal bit or a pseudo bit. If the extracted bit is a signal bit, it may be added to the extracted watermark signal. If the extracted bit is a pseudo bit, it is preferably not included as part of the extracted watermark signal. As discussed later in this document, the magnitude of the original coefficient and the embedding of a pseudo bit therein by the encoder can notify the decoder that the original coefficient was unsuitable for the embedding of a signal bit, and that a pseudo bit was embedded instead. Upon determining the "pseudo" status of an extracted bit, the decoder may then discard the bit to ensure it is properly excluded from the extracted watermark signal.

Integer Wavelet Transform:

The wavelet transform is widely applied to many different tasks in image processing. Since the wavelet transform coefficients are highly decorrelated, and because the wavelet transform is consistent with the feature of the human visual system (HVS), the wavelet transform is also widely applied to image data hiding. Evidence indicates that slight modification of wavelet transform coefficients in high frequency sub-bands is difficult to perceive. Hence, in one or more embodiments disclosed herein, data is embedded into the high-frequency wavelet coefficients.

To recover the original image losslessly, a reversible wavelet transform is preferably employed. Hence, one or more embodiments of the present invention employ the integer wavelet transformation which maps integer to integer [14] and which can reconstruct the original image from the transformed image without distortion. Although various wavelet families can be applied to our reversible embedding scheme, through extensive experimental comparison, it has been discovered that CDF(2,2) (where CDF refers to "Cohen-Daubechies-Feauveau") is better than other wavelet families in terms of data embedding capacity and the visual quality of the marked images. In addition, it is noted that the CDF(2,2) format has been adopted by the JPEG2000 standard [15]. FIG. 1 shows the forward and inverse transform formula of CDF(2,2). However, the present invention is not limited to the use of the CDF(2,2) format.

Spread Spectrum Data Hiding:

One embodiment of the reversible spread spectrum data hiding method is discussed in this section. After applying the one-level integer wavelet transformation discussed in the previous section, the following three high-frequency subbands: HL, LH, and HH are preferably obtained. It is observed that most of the high-frequency wavelet transform coefficients are small, having magnitudes near zero. The magnitude distributions of the high-frequency coefficients of four frequently used images, shown in FIG. 10, document this observation.

The method disclosed below exploits the existence of coefficients having small magnitudes of the coefficients discussed above and shown in FIG. 10.

In the following, W denotes one coefficient selected from one of the sub-bands HL, LH, HH, and $|W|<A$, $A>0$. To embed one bit in W, we have $$W' = W + A \cdot S \tag{1}$$

where W' denotes the modified coefficient, A is the shift value, and S is the sign factor which is defined in equation 2, below.

$$S = \begin{cases} 1, & \text{if the bit to be embedded is "1"} \\ -1, & \text{if the bit to be embedded is "0"} \end{cases} \tag{2}$$

Before discussing data extraction, the following property is identified. Specifically, because $|W|<A$, we have:

$$\text{Sign}(W') = \text{Sign}(W + A^*S) = \text{Sign}(A^*S) = \text{Sign}(S) \tag{3}$$

This indicates that we can extract the hidden bit by examining the sign of W'. That is, if Sign (W') is positive, bit "1" is extracted, while bit "0" is extracted if Sign (W') is negative.

To recover the original image, the IWT coefficient W is preferably recovered. According to Equation (1), we can restore W as follows.

$$W = W' - A \cdot S \tag{4}$$

In a preferred embodiment, for the above data embedding scheme to be reversible, the following two conditions must be satisfied. First, there is no overflow and/or underflow when the integer inverse wavelet transformation is applied. This condition is discussed in detail in the next section. Second, as was assumed at the beginning of the algorithm, the relation $|W|<A$ holds true. (The effect of variation in the value of A on data-embedding capacity and the visual quality of marked images is discussed later in this document).

Attention is now directed to a situation where the above assumption regarding the relative values of A and $|W|$ do not satisfy the above-stated assumption, thus where $|W| \geq A$. Fortunately, this situation can be handled by embedding a pseudo bit into each coefficient for which $|W| \geq A$.

(a) If $W \geq A$, we set $S=1$. Thus, one pseudo bit having a bit value "1" is embedded into the coefficient W. When decoding, the decoder will preferably extract a bit value of "1" from W' because W', given the foregoing conditions, would be positive. Subsequently, the original value of W can be recovered through Equation (4), shown above.

Upon noting that $|W| \geq A$ (a condition which fails to satisfy the second condition stated above for the reversibility of the disclosed data embedding scheme), the decoder can determine that the extracted bit having a value of "1" is a pseudo bit which is not a part of the watermark signal. Thus, this pseudo bit may be safely discarded without losing any part of the watermark signal.

The discussion continues considering the case where the coefficient, W, is negative.

(b) If $W \leq -A$, we let $S=-1$. Thus, a pseudo bit with a bit value of "0" is preferably embedded into the coefficient W. Thus, when decoding, the decoder preferably extracts a bit having a value of "0" from W' because W' is negative. Subsequently, we can recover the original W using equation (4). Thus, the original value of the coefficient W may be obtained. Moreover, the decoder can determine that the absolute value (magnitude) of the original coefficient W has the following relationship to the shift value A: $|W| \geq A$. Since this violates one of the second above-stated condition for reversible data hiding, the decoder preferably determines that the extracted "0" bit is a pseudo bit. Hence, the decoder can safely discard this bit, and decoding can proceed.

Two pieces of information can be provided to enable a decoder to know which coefficients to extract data from to reconstruct the watermark signal (the hidden data). First, information can be provided which identifies a group of coefficients into which data, whether signal bits or pseudo bits, are embedded. Second, information indicating whether the bit embedded into each coefficient in the identified group is a signal bit (i.e. a bit forming part of the watermark signal) or a pseudo bit (a bit which is not part of the watermark signal and which can be safely discarded without losing any of the data for the watermark signal).

In one or more embodiments, the group of coefficients into which data are embedded may be identified for a decoder separately from the data embedded in the image itself. This approach provides security since any entity intercepting the image will not be able to identify the marked coefficients (coefficients having data embedded therein) using information within the image. However, in an alternative embodiment, data describing the group of coefficients into which data are embedded may be included in the image itself.

Where information describing the group of coefficients into which data are embedded is communicated separately from the data in the image itself, various options are available for providing this information to a decoder. Where an entire block of coefficients exists for a frequency sub-band, coefficients within one quadrant of this block could be used for embedding data, and the location of this quadrant can be identified to the decoder. This is a space-efficient approach, since once the quadrant is identified, there is preferably no need to send data identifying each individual coefficient. Alternatively, one of many frequency sub-bands employed in the image could be identified, where all the coefficients in the identified frequency sub-band have data embedded therein.

Another approach involves a pre-existing understanding between the encoder and the decoder regarding the coefficients that will be used for encoding. This identification could be simplistic, as in identifying an entire quadrant of a block of coefficients having embedded data, or an entire frequency sub-band all of whose coefficients have embedded data. Alternatively, the identification could be more involved, specifically identifying marked coefficients by number and/or by location, these marked coefficients potentially being distributed throughout various coefficient blocks and/or various frequency sub-bands of the image.

Yet another approach involves using a random number generator which produces a particular output of numbers given an initial seed. In this embodiment, a common seed can be provided to both the encoder and the decoder. Thereafter, when either the encoder or the decoder needs an identification of the coefficients for data embedding and extraction, the output of the random number generator for the selected seed may be obtained by either the encoder or the decoder.

Once the coefficients to be used for embedding are identified by one or more of the methods identified above, the encoder preferably proceeds to embed the data as needed. However, as described above, when the magnitude of a coefficient, W, within the group of coefficients slated for data embedding is too large to be used for embedding watermark signal data (as discussed above), a pseudo bit is embedded in that coefficient instead of a signal bit. Thereafter, the decoder, upon calculating the original value of W using equation 4, is able to determine from the coefficient itself that the bit embedded in that coefficient is a pseudo bit. Where a pseudo bit is detected, the decoder preferably discards the pseudo bit, thereby correctly omitting this bit from data to be included in the extracted watermark signal.

The embedding of a pseudo bit into a coefficient in the manner described preferably indicates to the decoder that the coefficient into which the pseudo bit was embedded had an original value or original magnitude ("original" meaning the coefficient value prior to embedding data therein) that was too large to use for embedding watermark signal data in conjunction with a particular value of the shift value A. If the coefficient W is equal to or larger than the shift value A, then adding the product of A and S (where S is negative) will not succeed in forcing the sign of W' to equal the sign of the sign factor S. And the data embedding and decoding scheme disclosed herein depends on the property that Sign (S)=Sign W'.

When the decoder examines a coefficient, the decoder preferably first examines the sign of the coefficient to determine the sign of S, thereby also determining the sign of W'. Thereafter, the decoder preferably subtracts the product of A and S from the marked coefficient W' (which was generated in the encoding process), thereby providing the original coefficient W. The decoder can then compare the original coefficient W to A. If absolute value of W is equal to or greater than A, thus violating a condition for encoding a signal bit in to W, the decoder preferably determines that this coefficient contained a pseudo bit and preferably discards it.

By embedding the pseudo bits in unusable coefficients as described, the need for a location map or other bookkeeping scheme to describe for the decoder which coefficients, among the coefficients into which data has been embedded, have signal bits embedded therein and which coefficients have pseudo bits embedded therein is removed. This is true because the decoder can preferably make this determination on its own from the very data it is decoding. Compared with the method in [10] which uses the "location map" to record the modified coefficients, where data are hidden, then losslessly compresses the map and embeds the compressed map into the image as overhead data, embedding pseudo bits is a simpler and more effective bookkeeping scheme.

Histogram Modification:

For a given image, after data are embedded into some IWT coefficients, it is possible to cause overflow and/or underflow. This means that after the inverse integer wavelet transform is performed, the grayscale values of some pixels in the marked image may exceed the upper bound (the upper bound being 255 for an eight-bit grayscale image) and/or the lower bound (the lower bound being 0 for an eight-bit grayscale image). In this situation, truncation is generally applied to restore the resulting grayscale value to a permissible numerical range, thereby violating the reversibility of the data hiding. This is a challenging issue confronting all lossless data hiding algorithms.

In one or more embodiments of the present invention, in order to prevent overflow and/or underflow, a histogram modification procedure is adopted which narrows the range of histograms from both the left and right sides. Preferably, after the histogram modification, some grayscale values on the left-hand side of the histogram are merged towards the center of the histogram and left empty, while some grayscale values from the right-hand side are merged towards the center of the histogram and left empty. In the following discussion, it is assumed that we are going to narrow a histogram by G grayscale levels, which means that G grayscale values should be empty after the histogram gets modified.

A general example of histogram modification is presented below, followed by a more specific application of histogram modification to the reversible data hiding method disclosed herein. For the sake of simplicity, in this section, G is restricted to being an even number. (G is assigned a value of 40 in a later section within this document). Thus we can narrow down the histogram in G/2 passes, and in each pass the histogram is preferably narrowed down by two grayscale levels, one from the left-hand side, the other from the right-hand side.

In narrowing down a histogram to the range [G/2, 255-G/2], the histogram modification information is preferably recorded within data embedded into the image. The data to be embedded into the image therefore may arise from three sources: 1) the watermark signal; 2) pseudo data (if needed) and 3) the bookkeeping information of histogram modification.

Preferably, data are embedded in the order from high frequency (HH,HL,LH) to low frequency (LL), from low level to high level, and from least bit-plane to high bit-planes. In this way, the visual quality of the marked image can be optimized.

A SIMPLIFIED HISTOGRAM MODIFICATION EXAMPLE

In order to illustrate the histogram narrow-down process, we use a simplified example, where the size of an original image is 6×6 with 8=23 gray scales (6×6×3) as shown in FIGS. 3-4. From FIGS. 3-5, it can be seen that the range of the modified histogram now is from 1-6 instead of 0-7, i.e., no pixel has a grayscale value of either 0 or 7. After modification, grayscale value 1 is merged into grayscale value 2. Grayscale value 0 becomes gray scale 1. In the same way, grayscale value 6 is merged into grayscale value 5. Grayscale value 7 becomes grayscale value 6. The original and modified histograms are shown in FIG. 2. Data for the original and modified histograms are shown in FIG. 5. FIG. 6 illustrates bookkeeping information describing the histogram modification which can be recorded and which may be embedded into the image.

The left-hand side record bits with its left neighbor grayscale value (101101) in FIG. 6 show that both the second and fifth values of "2" by scanning (<x=5,y=1>,<x=1,y=4>) in FIG. 4B have values of "1" in FIG. 4A originally. Moreover, the right-hand side record bits with its right neighbor grayscale value (110111) in FIG. 6 shows that the third "5" by scanning (<x=4,y=2>) in FIG. 4B has the value "6" in FIG. 4A.

In the following, the discussion of histogram modification continues with an example more particularly directed to histograms of images having data embedded using methods in accordance with one or more embodiments of the present invention. One embodiment of a histogram narrowing algorithm is described in FIG. 7.

Figure 8C:
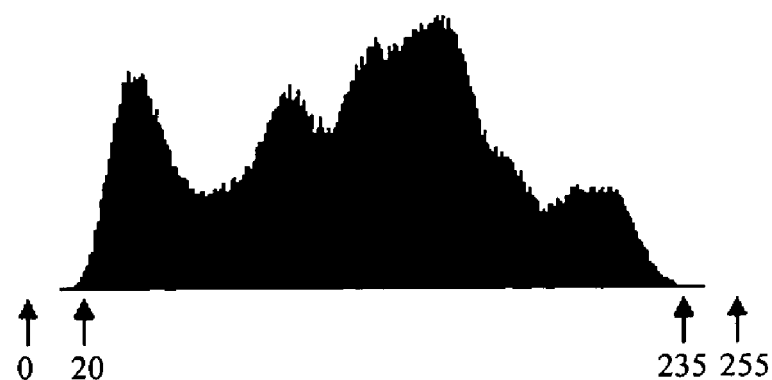
FIG. 8C is a histogram of the "Lena" image which image has been marked in accordance with one or more embodiments of the present invention.

An example of histogram modification of the "Lena" image with G=40 is shown in FIG. 7. In this example, the entries for grayscale values between 1 and 20 and between 235 and 255 are merged into the grayscale values of the central portion of the histogram. This process thereby shortens the grayscale range from (0-255) to (20-235). See FIGS. 8A and 8C. After the data are embedded into the image, the grayscale range is extended to some extent, but still remains in the range of (0-255) so as to avoid possible overflow and/or underflow. See FIG. 8C.

Figure 9:
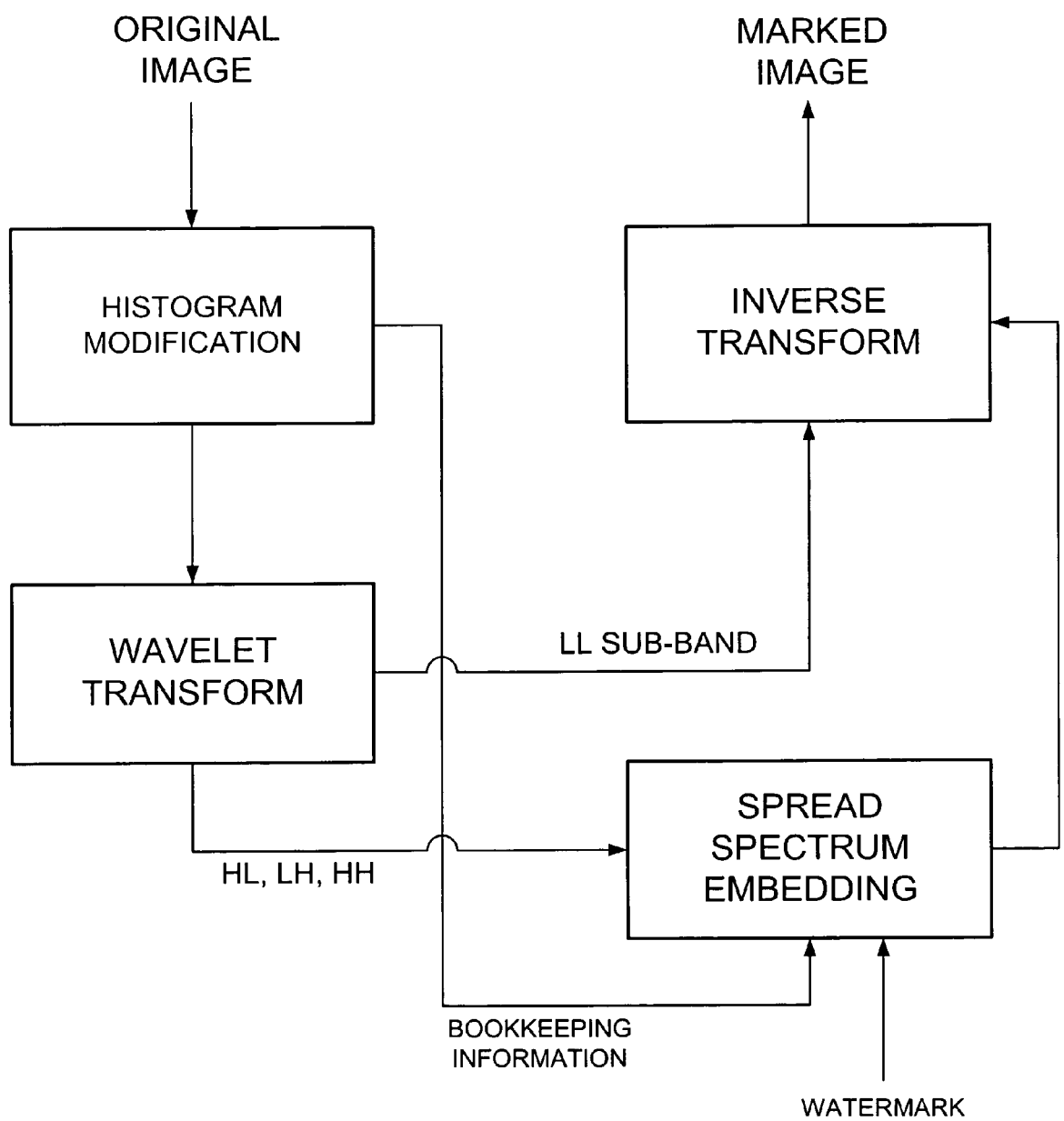
FIG. 9 is a block diagram of a method for data embedding in accordance with one or more embodiments of the present invention.

In narrowing down a histogram to the range [G/2, 255-G/2], it is beneficial to record the histogram modification information such as the grayscale values that are merged ($L_k$ and $R_k$ in FIG. 6) and the position of pixels whose grayscale values are equal to $L_k$ or $R_k$. and which are a part of the embedded data. This recorded information is referred to herein as bookkeeping information. Preferably, the original image can be losslessly restored using the recorded bookkeeping information. Generally speaking, the amount of bookkeeping information is small. The block diagram of this new reversible embedding method is given in FIG. 9.

Experimental Results:

For most images, most of the IWT (CDF(2,2)) coefficients in the high-frequency sub-bands have small magnitudes. This has been verified viewing statistics of some frequently used images, as shown in FIG. 10. FIG. 10 illustrates the percentages of high-frequency IWT coefficients falling into various ranges of coefficient magnitude. Hence, we can embed one bit into most of the high-frequency coefficients even when using small values of shift value, A.

The value of shift value A can be adjusted to achieve different payloads. Specifically, if the required payload is small, we may choose a small value of A so that the distortion of the marked image can be minimized. On the other hand, if the required payload is large, we may choose a larger A, resulting in larger distortion in the marked image. This method is more flexible and simpler than the Mean Square Error (MSE) minimization method proposed in [10]. FIGS. 15-18 present some experiment results of the payload vs. the Peak Signal to Noise Ratio (PSNR) of the embedded versions of the images shown in FIGS. 11-14.

Figure 19:
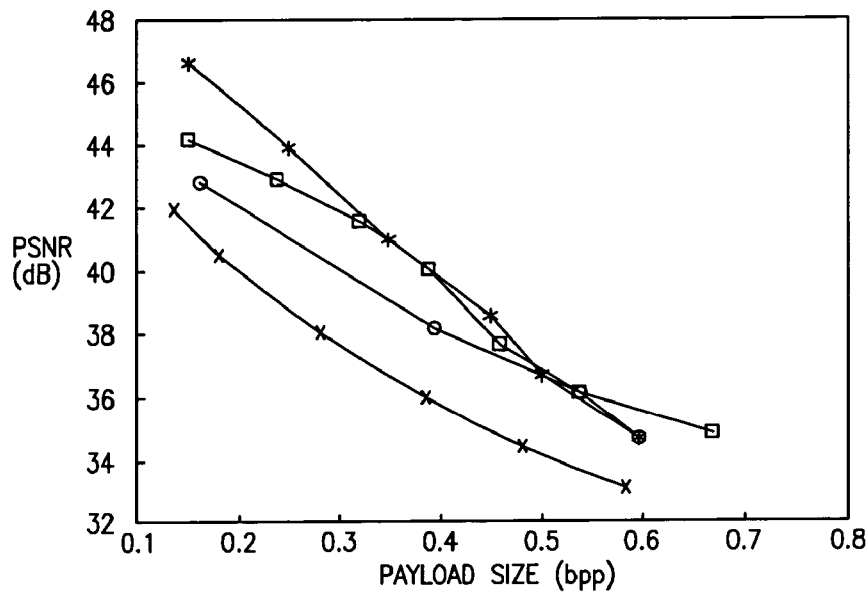
FIG. 19 is a graph of distortion plotted against data storage capacity for the "Lena" image employing a data embedding method in accordance with one or more embodiments of the present invention.
Figure 20:
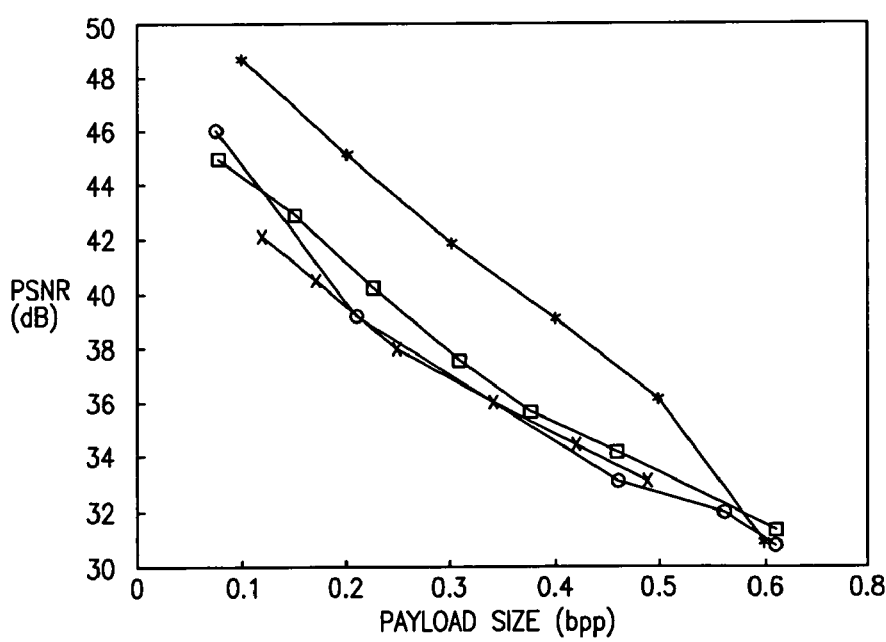
FIG. 20 is a graph of distortion plotted against data storage capacity for the "Barbara" image employing a data embedding method in accordance with one or more embodiments of the present invention.

The performance comparison with the state-of-the-art reversible data hiding schemes [6, 10, 11] in terms of data embedding capacity versus distortion of marked image on the "Lena" and "Barbara" test images is shown in FIGS. 19 and 29, respectively. The top curves in both figures are for one or more embodiments of the wavelet spread-spectrum method disclosed herein. It is observed that, at the same data embedding capacity, the PSNR of the marked images versus the original image when using the wavelet spread-spectrum method is higher than that obtained using other methods.

The documents listed below are hereby incorporated herein by reference.

[1] J. M. Barton, "Method and apparatus for embedding authentication information within digital data," U.S. Pat. No. 5,646,997, 1997.

[2] C. W. Honsinger, P. Jones, M. Rabbani, and J. C. Stoffel, "Lossless recovery of an original image containing embedded data," U.S. Pat. No. 6,278,791, 2001.

[3] J. Fridrich, M. Goljan and R. Du, "Invertible authentication," *Proc. SPIE Photonics West, Security and Watermarking of Multimedia Contents III*, Vol. 397, pp. 197-208, San Jose, Calif., January 2001.

[4] M. Goljan, J. Fridrich, and R. Du, "Distortion-free data embedding," *Proceedings of $4^{th}$ Information Hiding Workshop*, pp. 27-41, Pittsburgh, Pa., April 2001.

[5] J. Domingo-Ferrer and F. Seb'e, "Invertible spread-spectrum watermarking for image authentication and multilevel access to precision-critical watermarked images," *Proceedings of the International Conference on Information Technology: Coding and Computing*, pp. 152-157, April 2002.

[6] M. Celik, G. Sharma, A. M. Tekalp, and E. Saber, "Reversible data hiding," *Proceedings of the International Conference on Image Processing*, vol. 2, pp. 157-160, Rochester, N.Y., September 2002.

[7] G. Xuan, J. Zhu, J. Chen, Y. Q. Shi, Z. Ni and W. Su, "Distortionless data hiding based on integer wavelet transform," *IEE Electronics Letters*, December (2002) 1646-1648.

[8] C. De Vleeschouwer, J. F. Delaigle and B. Macq, "Circular interpretation of bijective transformations in lossless watermarking for media asset management," *IEEE Tran. Multimedia*, vol. 5, pp. 97-105, March 2003.

[9] Z. Ni, Y. Q. Shi, N. Ansari and W. Su, "Reversible data hiding," *Proceedings of IEEE International Symposium on Circuits and Systems*, vol. 2, pp. 912-915, Bangkok, Thailand, May 2003.

[10] J. Tian, "Reversible data embedding using a difference expansion," *IEEE Transactions on Circuits and Systems for Video Technology*, August (2003) 890-896.

[11] B. Yang, M. Schmucker, W. Funk, C. Busch, and S. Sun, "Integer DCT-based reversible watermarking for images using companding technique," *Proceedings of SPIE* Vol. #5306, 5306-41, January 2004.

[12] G. Xuan, Y. Q. Shi, Z. C. Ni, J. Chen, C. Yang, Y. Zhen, J. Zheng, "High capacity lossless data hiding based on integer wavelet transform," *Proceedings of IEEE 2004 International Symposium on Circuits and Systems*, vol. 11, pp. 29-32, May 2004, Vancouver, Canada.

[13] B. Sklar, *Digital Communications: Fundamentals and Applications*. Englewood Cliffs, N.J.: PTR Prentice Hall (1988).

[14] A. R. Calderbank, I. Daubechies, W. Sweldens, B. -L. Yeo, "Wavelet transforms that map integers to integers," In: *Applied and Computational Harmonic Analysis*, July (1998) 332-369.

[15] Rabbani and R. Joshi, "An Overview of the JPEG2000 Still Image Compression Standard", Signal Processing: Image Communication 17 (2002) 3-48.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method, comprising:
subjecting, in a device capable of performing image processing, an original, pixel domain image to an Integer Wavelet Transform (IWT) to obtain a matrix of original IWT coefficients;
selecting a plurality of said original IWT coefficients for embedding of data therein;
establishing a shift value for said plurality of original coefficients;
establishing a plurality of sign factors corresponding to respective ones of said plurality of original coefficients; and
for each of said plurality of original coefficients, establishing a marked coefficient, said marked coefficient corresponding to said original coefficient and to said sign factor corresponding to said original coefficient, said marked coefficient being set equal to a value of said original coefficient added to a product of a) said sign factor corresponding to said original coefficient and b) said shift value.

2. The method of claim 1 wherein said establishing said shift value comprises:
selecting a magnitude of said shift value as a function of a) a level of distortion of said image arising from said marking using said shift value and b) a quantity of data to be embedded into said image via said marking.

3. The method of claim 1 wherein said establishing said shift value comprises:
selecting said shift value based on a distribution of magnitudes among said plurality of original coefficients.

4. The method of claim 1 wherein said establishing said sign factor corresponding to each said original coefficient comprises establishing a sign of said sign factor.

5. The method of claim 1 wherein said establishing said sign factor corresponding to each said original coefficient comprises:
for each said original coefficient having a magnitude greater than or equal to said shift value, thereby providing a large coefficient, setting a sign of the sign factor for said large coefficient equal to the sign of said large coefficient.

6. The method of claim 1 wherein said establishing said sign factor comprises:
setting each said sign factor equal to either +1 or −1 based on a bit value to be embedded in said original coefficient corresponding to each said sign factor.

7. The method of claim 1 wherein said establishing said sign factor comprises at least one operation selected from the group consisting of:
setting each said sign factor equal to +1 if a bit value slated for embedding in said original coefficient corresponding to said sign factor is one of 1 and 0; and
setting each said sign factor equal to −1 if a bit value slated for embedding in said original coefficient corresponding to said sign factor is the other of 1 and 0.

8. The method of claim 1 wherein said establishing said marked coefficient for each said original coefficient comprises:
embedding a watermark signal into said image.

9. The method of claim 1 wherein said establishing said marked coefficient comprises one operation selected from the group consisting of:
embedding a signal bit forming part of a watermark signal into said marked coefficient if a magnitude of said original coefficient corresponding to said marked coefficient is less than a magnitude of said shift value; and
embedding a pseudo bit into said marked coefficient if said magnitude of said original coefficient corresponding to said marked coefficient is greater than or equal to said magnitude of said shift value.

10. The method of claim 1 further comprising:
narrowing an initial histogram of said image prior to said establishing said marked coefficient.

11. The method of claim 10 wherein said narrowing comprises:
relocating toward a center of said initial histogram pixel counts for grayscale values lower than a specified threshold; and
relocating toward a center of said initial histogram pixel counts for grayscale values higher than a grayscale value equal to a maximum grayscale value for said initial histogram minus said specified threshold.

12. The method of claim 10 further comprising:
recording data describing said narrowing of said histogram as bookkeeping data.

13. The method of claim 12 further comprising:
embedding said bookkeeping information in said image.

14. The method of claim 1 wherein said shift value is equal to one.

15. A computer-readable storage medium containing a software program operable to cause an apparatus including a processor operating under the instructions of the software program to perform actions, including:

subjecting an original, pixel domain image to an Integer Wavelet Transform (IWT) to obtain a matrix of original IWT coefficients; selecting a plurality of said original IWT coefficients for embedding of data therein;

establishing a shift value for said plurality of original coefficients;

establishing a plurality of sign factors corresponding to respective ones of said plurality of original coefficients; and for each of said plurality of original coefficients, establishing a marked coefficient, said marked coefficient corresponding to said original coefficient and to said sign factor corresponding to said original coefficient, said marked coefficient being set equal to a value of said original coefficient added to a product of a) said sign factor corresponding to said original coefficient and b) said shift value.

16. The medium of claim 15 wherein said establishing said shift value comprises:

selecting a magnitude of said shift value as a function of a) a level of distortion of said image arising from said marking using said shift value and b) a quantity of data to be embedded into said image via said marking.

17. The medium of claim 15 wherein said establishing said shift value comprises:

selecting said shift value based on a distribution of magnitudes among said plurality of original coefficients.

18. The medium of claim 15 wherein said establishing said sign factor corresponding to each said original coefficient comprises establishing a sign of said sign factor.

19. The medium of claim 15 wherein said establishing said sign factor corresponding to each said original coefficient comprises:

for each said original coefficient having a magnitude greater than or equal to said shift value, thereby providing a large coefficient, setting a sign of the sign factor for said large coefficient equal to the sign of said large coefficient.

20. The medium of claim 15 wherein said establishing said sign factor comprises:

setting each said sign factor equal to either +1 or −1 based on a bit value to be embedded in said original coefficient corresponding to each said sign factor.

21. The medium of claim 15 wherein said establishing said sign factor comprises at least one operation selected from the group consisting of:

setting each said sign factor equal to +1 if a bit value slated for embedding in said original coefficient corresponding to said sign factor is one of 1 and 0; and setting each said sign factor equal to −1 if a bit value slated for embedding in said original coefficient corresponding to said sign factor is the other of 1 and 0.

22. The medium of claim 15 wherein said establishing said marked coefficient for each said original coefficient comprises:

embedding a watermark signal into said image.

23. The medium of claim 15 wherein said establishing said marked coefficient comprises one operation selected from the group consisting of:

embedding a signal bit forming part of a watermark signal into said marked coefficient if a magnitude of said original coefficient corresponding to said marked coefficient is less than a magnitude of said shift value; and embedding a pseudo bit into said marked coefficient if said magnitude of said original coefficient corresponding to said marked coefficient is greater than or equal to said magnitude of said shift value.

24. The medium of claim 15 wherein said actions further comprise:

narrowing an initial histogram of said image prior to said establishing said marked coefficient.

25. The medium of claim 24 wherein said narrowing comprises:

relocating toward a center of said initial histogram pixel counts for grayscale values lower than a specified threshold; and relocating toward a center of said initial histogram pixel counts for grayscale values higher than a grayscale value equal to a maximum grayscale value for said initial histogram minus said specified threshold.

26. The medium of claim 24 wherein said actions further comprise:

recording data describing said narrowing of said histogram as bookkeeping data.

27. The medium of claim 26 wherein said actions further comprise:

embedding said bookkeeping information in said image.

28. The medium of claim 15 wherein said shift value is equal to one.

29. A method, comprising:

subjecting, by a device capable of image processing, a marked pixel domain image to an Integer Wavelet Transform (IWT) to obtain a matrix of wavelet coefficients;

selecting a plurality of said coefficients from said matrix that contain embedded information; and for each said selected coefficient, extracting a data bit embedded in said coefficient, a bit value of said extracted data bit determined based on a sign of said coefficient.

30. The method of claim 25 wherein said selected plurality of coefficients comprises coefficients within at least one frequency sub-band of said matrix of IWT coefficients.

31. The method of claim 25 wherein said selected plurality of coefficients comprises coefficients located within at least one frequency sub-band selected from the group consisting of: an HL sub-band, an LH sub-band, and an HH sub-band.

32. The method of claim 25 wherein said selected plurality of coefficients comprises:

coefficients indicated by the output of a random number generator, the random number generator employing a seed used by an encoder to identify said selected plurality of coefficients for embedding data.

33. The method of claim 25 wherein said extracting comprises at least one operation selected from the group consisting of:

for each said selected coefficient, extracting a bit value of "1" if said sign of said coefficient is one of positive and negative; and extracting a bit value of "0" if said sign of said coefficient is the other of positive and negative.

34. The method of claim 29 wherein said extracting comprises:

for each said selected coefficient, extracting either a signal bit or a pseudo bit from said coefficient depending on a magnitude of said coefficient.

35. The method of claim 29 wherein said extracting comprises:

for each said selected coefficient, extracting a signal bit forming part of a watermark signal embedded into said marked image if a pre-embedding magnitude of said coefficient is less than a magnitude of a shift value used for marking said image.

36. The method of claim 29 wherein said extracting comprises:
for each said selected coefficient, extracting a pseudo bit to be excluded from a watermark signal to be extracted from said marked image if a pre-embedding magnitude of said coefficient is greater than or equal to a magnitude of a shift value used for marking said image.

37. The method of claim 29 further comprising:
for each said selected coefficient, restoring a coefficient value existing prior to an embedding of data in said coefficient, thereby restoring a condition of said image prior to said embedding.

38. The method of claim 37 wherein an initial histogram of said image was narrowed prior to said embedding and bookkeeping data was preserved describing said narrowing, the method further comprising:
restoring said initial histogram of said image using said preserved bookkeeping data.

39. The method of claim 38 further comprising:
extracting said bookkeeping data from said matrix of wavelet coefficients.

40. A computer-readable storage medium containing a software program operable to cause an apparatus including a processor operating under the instructions of the software program to perform actions, comprising:
subjecting a marked pixel domain image to an Integer Wavelet Transform (IWT) to obtain a matrix of wavelet coefficients;
selecting a plurality of said coefficients from said matrix that contain embedded information; and
for each said selected coefficient, extracting a data bit embedded in said coefficient, a bit value of said extracted data bit determined based on a sign of said coefficient.

41. The medium of claim 40 wherein said selected plurality of coefficients comprises coefficients within at least one frequency sub-band of said matrix of IWT coefficients.

42. The medium of claim 40 wherein said selected plurality of coefficients comprises coefficients located within at least one frequency sub-band selected from the group consisting of: an HL sub-band, an LH sub-band, and an HH sub-band.

43. The medium of claim 40 wherein said selected plurality of coefficients comprises:
coefficients indicated by the output of a random number generator, the random number generator employing a seed used by an encoder to identify said selected plurality of coefficients for embedding data.

44. The medium of claim 40 wherein said extracting comprises at least one operation selected from the group consisting of:
for each said selected coefficient, extracting a bit value of "1" if said sign of said coefficient is one of positive and negative; and
extracting a bit value of "0" if said sign of said coefficient is the other of positive and negative.

45. The medium of claim 40 wherein said extracting comprises:
for each said selected coefficient, extracting either a signal bit or a pseudo bit from said coefficient depending on a magnitude of said coefficient.

46. The medium of claim 40 wherein said extracting comprises:
for each said selected coefficient, extracting a signal bit forming part of a watermark signal embedded into said marked image if a pre-embedding magnitude of said coefficient is less than a magnitude of a shift value used for marking said image.

47. The medium of claim 40 wherein said extracting comprises:
for each said selected coefficient, extracting a pseudo bit to be excluded from a watermark signal to be extracted from said marked image if a pre-embedding magnitude of said coefficient is greater than or equal to a magnitude of a shift value used for marking said image.

48. The medium of claim 40 wherein said actions further comprise:
for each said selected coefficient, restoring a coefficient value existing prior to an embedding of data in said coefficient, thereby restoring a condition of said image prior to said embedding.

49. The medium of claim 48 wherein an initial histogram of said image was narrowed prior to said embedding and bookkeeping data was preserved describing said narrowing, said actions further comprising:
restoring said initial histogram of said image using said preserved bookkeeping data.

50. The medium of claim 49 wherein said actions further comprise:
extracting said bookkeeping data from said matrix of wavelet coefficients.

51. An apparatus comprising:
means for subjecting an original, pixel domain image to an Integer Wavelet Transform (IWT) to obtain a matrix of original IWT coefficients;
means for selecting a plurality of said original IWT coefficients for embedding of data therein;
means for establishing a shift value for said plurality of original coefficients;
means for establishing a plurality of sign factors corresponding to respective ones of said plurality of original coefficients; and
means for, for each of said plurality of original coefficients, establishing a marked coefficient, said marked coefficient corresponding to said original coefficient and to said sign factor corresponding to said original coefficient, said marked coefficient being set equal to a value of said original coefficient added to a product of a) said sign factor corresponding to said original coefficient and b) said shift value.

52. The apparatus of claim 51, wherein said means for establishing said shift value comprises at least one means selected from the group consisting of:
means for selecting a magnitude of said shift value as a function of a) a level of distortion of said image arising from said marking using said shift value and b) a quantity of data to be embedded into said image via said marking; and
means for selecting said shift value based on a distribution of magnitudes among said plurality of original coefficients.

53. The apparatus of claim 51, wherein said means for establishing said sign factor comprises:
means for setting each said sign factor equal to either +1 or −1 based on a bit value to be embedded in said original coefficient corresponding to each said sign factor.

54. The apparatus of claim 51, wherein said means for establishing said marked coefficient comprises means for performing one operation selected from the group consisting of:
embedding a signal bit forming part of a watermark signal into said marked coefficient if a magnitude of said original coefficient corresponding to said marked coefficient is less than a magnitude of said shift value; and embedding a pseudo bit into said marked coefficient if said magnitude of said original coefficient corresponding to said marked coefficient is greater than or equal to said magnitude of said shift value.

55. The apparatus of claim 51, further comprising:
means for narrowing an initial histogram of said image prior to said establishing said marked coefficient.

56. The apparatus of claim 55, wherein said means for narrowing comprises:
means for relocating toward a center of said initial histogram pixel counts for grayscale values lower than a specified threshold; and
means for relocating toward a center of said initial histogram pixel counts for grayscale values higher than a grayscale value equal to a maximum grayscale value for said initial histogram minus said specified threshold.

57. An apparatus, comprising:
means for subjecting a marked pixel domain image to an Integer Wavelet Transform (IWT) to obtain a matrix of wavelet coefficients;
means for selecting a plurality of said coefficients from said matrix that contain embedded information; and
means for, for each said selected coefficient, extracting a data bit embedded in said coefficient, a bit value of said extracted data bit determined based on a sign of said coefficient.

58. The apparatus of claim 57, wherein said selected plurality of coefficients comprises:
coefficients indicated by the output of a random number generator, the random number generator employing a seed used by an encoder to identify said selected plurality of coefficients for embedding data.

59. The apparatus of claim 57, wherein said means for extracting comprises means for performing at least one operation selected from the group consisting of:
for each said selected coefficient, extracting a bit value of "1" if said sign of said coefficient is one of positive and negative; and
extracting a bit value of "0" if said sign of said coefficient is the other of positive and negative.

60. The apparatus of claim 57, wherein said means for extracting comprises:
means for, for each said selected coefficient, extracting either a signal bit or a pseudo bit from said coefficient depending on a magnitude of said coefficient.

61. The apparatus of claim 57, wherein said means for extracting comprises:
means for, for each said selected coefficient, extracting a signal bit forming part of a watermark signal embedded into said marked image if a pre-embedding magnitude of said coefficient is less than a magnitude of a shift value used for marking said image.

62. The apparatus of claim 57, further comprising:
means for, for each said selected coefficient, restoring a coefficient value existing prior to an embedding of data in said coefficient, thereby restoring a condition of said image prior to said embedding.

63. An apparatus for encoding data in an image, comprising:
a integer wavelet transformer (IWT) configured to transform the image to obtain a matrix of IWT coefficients;
a data embedder configured to receive data and to embed the data into a selected subset of the IWT coefficients, wherein the data embedder is configured to:
establish a shift value for the subset of IWT coefficients;
establish a plurality of sign factors corresponding to respective ones of the subset of IWT coefficients; and
for each of the subset of IWT coefficients, establish a marked coefficient, the marked coefficient corresponding to one of the subset of IWT coefficients and to the sign factor corresponding to that IWT coefficient, the marked coefficient being set equal to a value of the IWT coefficient added to a product of a) the sign factor corresponding to the IWT coefficient and b) the shift value.

64. The apparatus of claim 63, wherein the data embedder is further configured to select a magnitude of the shift value as a function of a) a level of distortion of said image arising from marking using the shift value and b) a quantity of data to be embedded into the image via the marking.

65. The apparatus of claim 63, wherein the data embedder is further configured to establish the shift value by for selecting the shift value based on a distribution of magnitudes among the subset of IWT coefficients.

66. The apparatus of claim 63, wherein the data embedder is further configured to, for each of the subset of IWT coefficients having a magnitude greater than or equal to the shift value, thereby being a large coefficient, set a sign of the sign factor for the large coefficient equal to the sign of the large coefficient.

67. The apparatus of claim 63, wherein the data embedder is further configured to set each sign factor equal to either +1 or −1 based on a bit value to be embedded in the IWT coefficient corresponding to each sign factor.

68. The apparatus of claim 63, wherein the data embedder is configured to perform at least one operation selected from the group consisting of:
setting each sign factor equal to +1 if a bit value slated for embedding in a corresponding IWT coefficient is one of 1 and 0; and
setting each sign factor equal to −1 if a bit value slated for embedding in a corresponding IWT coefficient is the other of 1 and 0.

69. The apparatus of claim 63, wherein the data embedder is configured to embed a watermark signal into the image.

70. The apparatus of claim 63, wherein the data embedder is configured to perform one operation selected from the group consisting of:
embedding a signal bit forming part of a watermark signal into a marked coefficient if a magnitude of the corresponding IWT coefficient is less than a magnitude of the shift value; and
embedding a pseudo bit into the marked coefficient if the magnitude of the corresponding IWT coefficient is greater than or equal to the magnitude of the shift value.

71. The apparatus of claim 63, further comprising:
a histogram modifier configured to narrow an initial histogram of the image prior to providing the image to the image transformer.

72. The apparatus of claim 71, wherein the histogram modifier is configured to:
relocate toward a center of the initial histogram pixel counts for grayscale values lower than a specified threshold; and
relocate toward a center of the initial histogram pixel counts for grayscale values higher than a grayscale value equal to a maximum grayscale value for the initial histogram minus the specified threshold.

73. The apparatus of claim 71, wherein the data embedder is further configured to receive from the histogram modifier data describing the narrowing of the histogram as bookkeeping data.

74. The apparatus of claim 73, wherein the data embedder is further configured to embed the bookkeeping data into at least a subset of the IWT coefficients.

75. The apparatus of claim 63, wherein the shift value is equal to one.

76. The apparatus of claim 63, further comprising:

a inverse transformer configured to receive marked coefficients from the data embedder and to output a marked image.

77. The apparatus of claim 76, wherein the inverse transformer is configured to receive from the inverse transformer a subset of IWT coefficients in which data is not embedded.

78. An apparatus, comprising:

a processor to operate under the instructions of a software program stored on a memory, the software program being operable to cause the apparatus to perform actions, including:

subjecting an original, pixel domain image to an Integer Wavelet Transform (IWT) to obtain a matrix of original IWT coefficients; selecting a plurality of said original IWT coefficients for embedding of data therein;

establishing a shift value for said plurality of original coefficients;

establishing a plurality of sign factors corresponding to respective ones of said plurality of original coefficients; and for each of said plurality of original coefficients, establishing a marked coefficient, said marked coefficient corresponding to said original coefficient and to said sign factor corresponding to said original coefficient, said marked coefficient being set equal to a value of said original coefficient added to a product of a) said sign factor corresponding to said original coefficient and b) said shift value.

79. The apparatus of claim 78, wherein said establishing said shift value comprises at least one action selected from the group consisting of:

selecting a magnitude of said shift value as a function of a) a level of distortion of said image arising from said marking using said shift value and b) a quantity of data to be embedded into said image via said marking; and selecting said shift value based on a distribution of magnitudes among said plurality of original coefficients.

80. The apparatus of claim 78, wherein said establishing said sign factor comprises:

setting each said sign factor equal to either +1 or −1 based on a bit value to be embedded in said original coefficient corresponding to each said sign factor.

81. The apparatus of claim 78, wherein said establishing said marked coefficient comprises performing one operation selected from the group consisting of:

embedding a signal bit forming part of a watermark signal into said marked coefficient if a magnitude of said original coefficient corresponding to said marked coefficient is less than a magnitude of said shift value; and embedding a pseudo bit into said marked coefficient if said magnitude of said original coefficient corresponding to said marked coefficient is greater than or equal to said magnitude of said shift value.

82. The apparatus of claim 78, said actions further comprising:

narrowing an initial histogram of said image prior to said establishing said marked coefficient.

83. The apparatus of claim 82, wherein said narrowing comprises:

relocating toward a center of said initial histogram pixel counts for grayscale values lower than a specified threshold; and relocating toward a center of said initial histogram pixel counts for grayscale values higher than a grayscale value equal to a maximum grayscale value for said initial histogram minus said specified threshold.

84. An apparatus, comprising:

a processor to operate under the instructions of a software program stored on a memory, the software program being operable to cause the apparatus to perform actions, including:

subjecting a marked pixel domain image to an Integer Wavelet Transform (IWT) to obtain a matrix of wavelet coefficients;

selecting a plurality of said coefficients from said matrix that contain embedded information; and for each said selected coefficient, extracting a data bit embedded in said coefficient, a bit value of said extracted data bit determined based on a sign of said coefficient.

85. The apparatus of claim 84, wherein said selected plurality of coefficients comprises:

coefficients indicated by the output of a random number generator, the random number generator employing a seed used by an encoder to identify said selected plurality of coefficients for embedding data.

86. The apparatus of claim 84, wherein said extracting comprises performing at least one operation selected from the group consisting of:

for each said selected coefficient, extracting a bit value of "1" if said sign of said coefficient is one of positive and negative; and extracting a bit value of "0" if said sign of said coefficient is the other of positive and negative.

87. The apparatus of claim 84, wherein said extracting comprises:

for each said selected coefficient, extracting either a signal bit or a pseudo bit from said coefficient depending on a magnitude of said coefficient.

88. The apparatus of claim 84, wherein said extracting comprises:

for each said selected coefficient, extracting a signal bit forming part of a watermark signal embedded into said marked image if a pre-embedding magnitude of said coefficient is less than a magnitude of a shift value used for marking said image.

89. The apparatus of claim 84, said actions further comprising:

for each said selected coefficient, restoring a coefficient value existing prior to an embedding of data in said coefficient, thereby restoring a condition of said image prior to said embedding.

* * * * *